Feb. 9, 1960 — G. A. MUNRO — 2,924,129
ADJUSTABLE BORING BAR
Filed Sept. 22, 1958 — 3 Sheets-Sheet 1
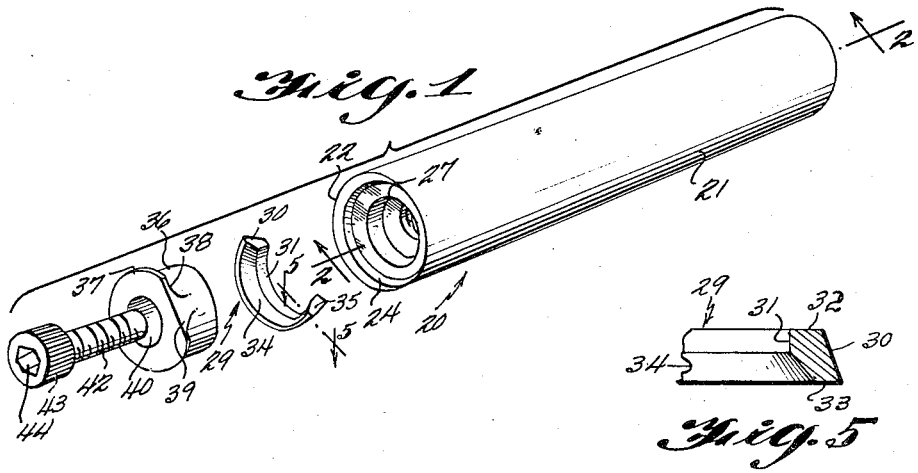
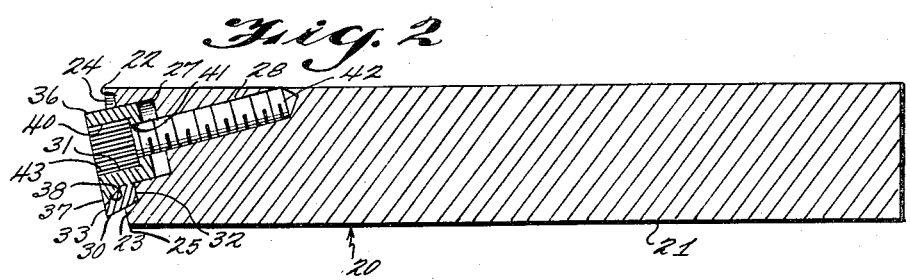
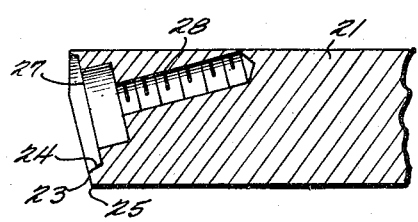
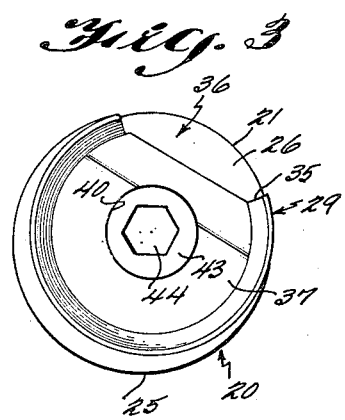
INVENTOR.
GEORGE A. MUNRO
BY
Kimmel & Crowell
ATTORNEYS Feb. 9, 1960 G. A. MUNRO 2,924,129
ADJUSTABLE BORING BAR
Filed Sept. 22, 1958 3 Sheets-Sheet 2
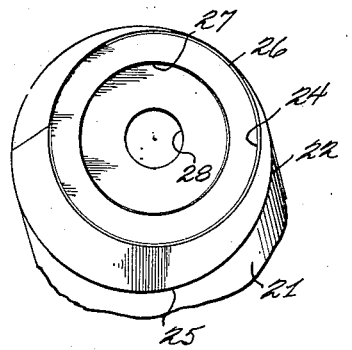
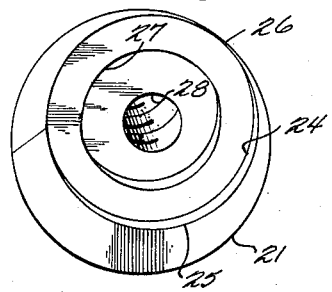
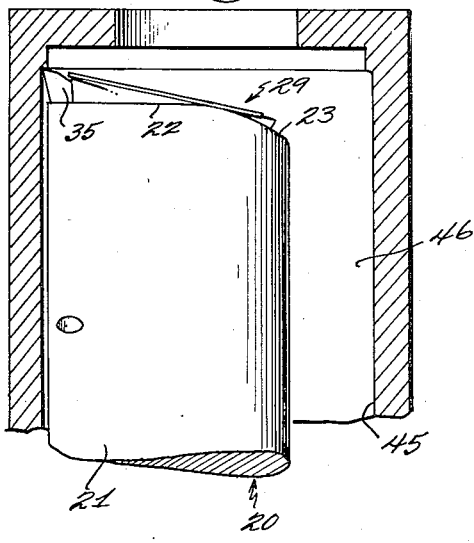
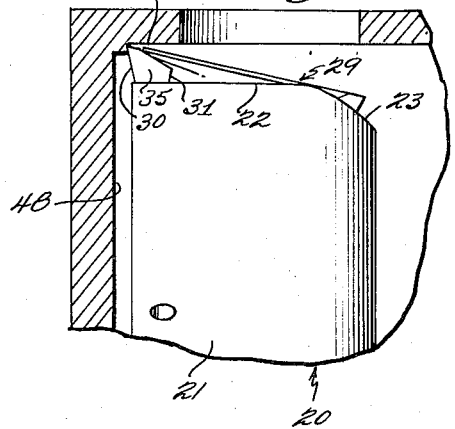
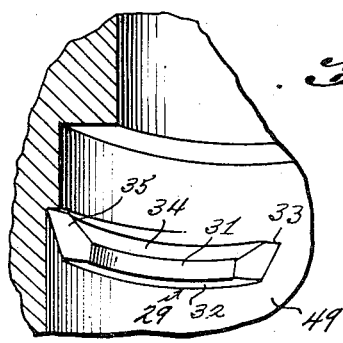
INVENTOR
GEORGE A. MUNRO
BY Kimmel & Crowell
ATTORNEYS

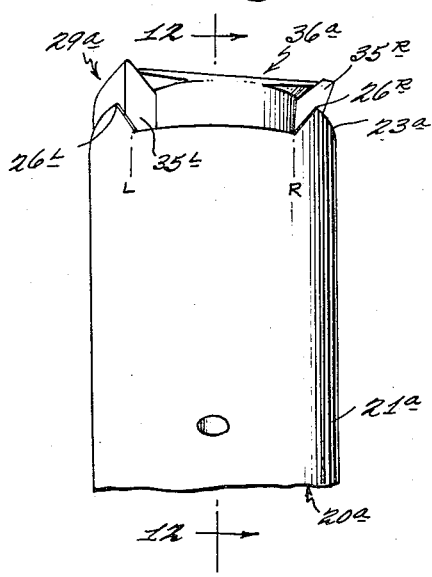
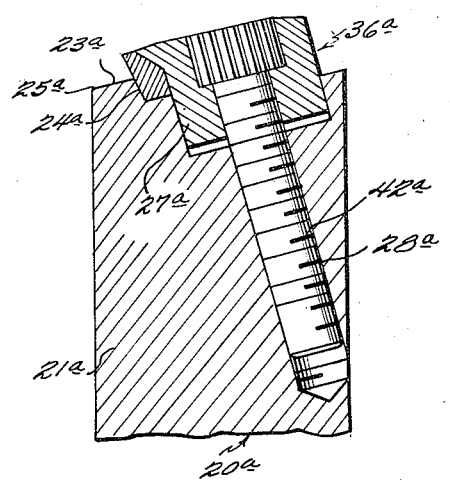
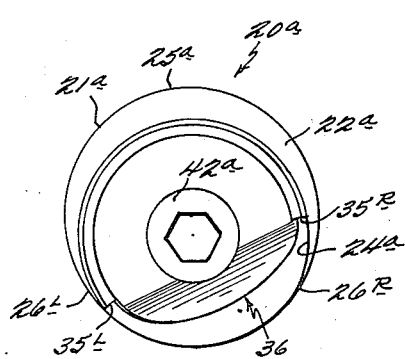
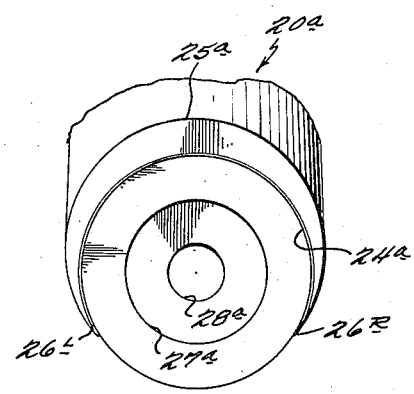

United States Patent Office 2,924,129
Patented Feb. 9, 1960

2,924,129

ADJUSTABLE BORING BAR

George A. Munro, Davison, Mich.

Application September 22, 1958, Serial No. 762,576

5 Claims. (Cl. 77—58)

The present invention relates to adjustable boring bars and particularly to adjustable boring bars having cutting bits adjustably and detachably secured thereto.

The primary object of the invention is to provide an adjustable boring bar having a replaceable cutting bit which can be detached from the boring bar and sharpened with conventional sharpening tools.

Another object of the invention is to provide an adjustable boring bar of the class described above which will operate in a clockwise or counter-clockwise direction, as required.

A further object of the invention is to provide an adjustable boring bar of the class described above in which the cutting bit can be adjusted eccentrically with respect to the boring bar to vary the depth of cut.

A still further object of the invention is to provide an adjustable boring bar of the class described above which is inexpensive to manufacture, simple to adjust and sharpen and which is extremely accurate in operation.

Other objects and advantages will become apparent in the following specification when considered in the light of the attached drawings, in which:

Figure 1 is an exploded perspective view of the preferred form of the invention;

Figure 2 is an enlarged longitudinal sectional view taken along the line 2—2 of Figure 1, looking in the direction of the arrows with the parts in assembled position;

Figure 3 is an enlarged end elevation of the cutting bit end of the boring bar;

Figure 4 is a fragmentary sectional view, similar to Figure 2, with the cutting assembly removed;

Figure 5 is an enlarged fragmentary transverse section taken along the line 5—5 of Figure 1, looking in the direction of the arrows;

Figure 6 is an end elevation similar to Figure 3 with the cutting assembly removed;

Figure 7 is a fragmentary end perspective view of the end of the boring bar illustrated in Figure 6, with the cutting assembly removed;

Figure 8 is an enlarged side elevation of the invention illustrated in cutting position with respect to the side wall of a counter bore;

Figure 9 is a view similar to Figure 8 with the cutting bit illustrated in cutting position with respect to the bottom wall of a counter bore;

Figure 10 is a fragmentary perspective view of the cutter bit removed from the boring bar illustrating its relationship to the counter bore during a cutting operation;

Figure 11 is a fragmentary side elevation of a modified form of the invention;

Figure 12 is a fragmentary vertical section taken along the line 12—12 of Figure 11, looking in the direction of the arrows;

Figure 13 is an end elevation of the cutting assembly end of the boring bar; and Figure 14 is a fragmentary perspective view of the boring bar with the cutter assembly removed therefrom.

Referring now to the drawings in detail wherein like reference characters indicate like parts throughout the several figures and with particular reference to Figures 1 through 10, the reference numeral 20 indicates generally an adjustable boring bar constructed in accordance with the invention.

The boring bar 20 includes an elongated generally cylindrical solid body 21 having the end 22 thereof truncated at 23, as best seen in Figure 4, at an angle of approximately 15 degrees with respect to the end 22. The 15 degrees angle mentioned is for purposes of illustration only since with different types of materials being turned and different materials being used in cutting tools, this angle would have to be varied. A generally circular inwardly tapering conical recess 24 is formed in the end 22 of the body 21 with its axis perpendicular to the truncated end 23 of the body 21.

The conical recess 24 is located with respect to the body 21 with its axis intersecting a diameter of the body 21 which passes through the low point 25 of the truncated end 23. The conical recess 24 is arranged in the end 22 of the body 21 so that the major circumference of the conical recess 24 intersects the cylindrical surface of the body 21 at a point 26 spaced 135 degrees from the low point 25. The mentioned angle of 135 degrees may have to be varied in specific circumstances from 90 degrees to 180 degrees.

A cylindrical bore 27 having a diameter somewhat less than that of the recess 24 extends into the body 21 coaxially with the recess 24. A threaded bore 28 extends into the body 21 from the bottom of the cylindrical bore 27 coaxially therewith. The threaded bore 28 is substantially smaller in diameter than the cylindrical bore 27.

A ring type cutting bit, generally indicated at 29, is provided with an outer conical wall 30 and an inner cylindrical wall 31. The outer conical wall 30 is connected to the inner cylindrical wall 31 by a semi-circular bottom wall 32 extending perpendicularly to the axis of the cylindrical wall 31. The outer conical wall 30 has a relatively short semi-circular top wall 33 extending inwardly from the upper edge thereof parallel to the bottom wall 32.

An outwardly sloping conical wall 34 connects the upper end of the inner wall 31 and the inner edge of the top wall 33, as best shown in Figure 5. The cutting bit 29 has a cutting edge 35 formed thereon by grinding radially one end of the bit 29 at an angle to the axle thereof.

The cutting bit 29 is seated in the conical recess 24 with the outer conical wall 30 thereof in engagement with the side wall of the conical recess 24 and the bottom wall 32 in engagement with the bottom of the conical recess 24, as best seen in Figure 2.

A generally cylindrical retainer 36 engages in the cylindrical bore 27 in the body 21 and the inner cylindrical wall 31 of the cutting bit 29. The retainer 36 has a head 37 extending radially outwardly from one end thereof. The head 37 has an inwardly and downwardly sloping conical lower face 38 for engaging the conical wall 34 of the cutter bit 29. The head 37 is flattened at 39 to engage between the cutting edge 35 and the opposite end of the cutter bit 29, permitting the cutting edge 35 to be used without interference.

The retainer 36 has a relatively large axial bore 40 extending inwardly thereof from the end carrying the head 37. A somewhat smaller axial bore 41 communicates with the bore 40 and extends through the inner end of the retainer 36.

A threaded bolt 42 extends through the bore 41 and is threaded into the threaded bore 28 in the body 21. The threaded bolt 42 has a cylindrical head 43 integrally formed thereon and engaging in the bore 40 to secure the retainer 36 to the body 21. The cylindrical head 43 is provided with a drive socket 44, as best seen in Figure 1.

The cutting bit 29 is retained in the recess 24 by the retainer 36 clamped in place by the threaded bolt 42. By loosening the bolt 42 the cutting bit 29 can be rotated in the recess 24 to vary the extent of penetration of the cutting edge 35, as can be seen in Figure 3.

To sharpen the cutter bit 29 it is removed from the body 21 by first removing the bolt 42 and the retainer 36 and the cutting edge 35 is then sharpened by grinding flat across the end thereof radially.

On most production type machines the tool travels a constant distance by either cam feeds or hydraulic feeds, controlled by a positive stop. Consequently, when the bits need changing, the tool itself must be adjusted on its holder to regulate the size of the cut required. It is sometimes difficult to sharpen or change a bit and position the tool in its holder so that the succeeding cut is the proper size.

One of the unique qualities of the adjustable boring bar 20 is that of the simplicity of changing or sharpening the cutter bit 29 and replacing it so that the succeeding cut is exactly as required. By scribing a line on the side of the boring bar level with the tip of the cutting edge 35 before removing the cutting bit 29, a new bit 29, or resharpened bit 29, can be set in the boring bar 20 so that the succeeding cut is identical to that of the previous cut.

With the structures illustrated in Figures 1 through 10 the direction of cut with respect to the boring bar 20, as viewed in Figure 3, is counter-clockwise. In Figure 8 the boring bar 20 is illustrated in cutting position with respect to the side wall 45 of a counter bore 46. The boring bar 20 is moved in a direction parallel to the axis of the counter bore 46 when cutting the side wall 45. In Figure 9 the boring bar 20 is illustrated in position to cut the bottom wall 47 of a counter bore 48. When cutting the bottom wall 47 of a counter bore 48, the boring bar 20 is moved perpendicularly outwardly with respect to the axis of the counter bore 48.

In Figure 10 the cutter bit 29 is shown removed from the body 21 and positioned in cutting relation with respect to a counter bore 49. Figure 10 further illustrates how succeeding cuts are made with the bit 29 to arrive at the final diameter of the counter bore 49.

Referring now to Figures 11 through 14, a modified adjustable boring bar 20A is illustrated.

The boring bar 20A includes an elongated, generally cylindrical solid body 21A having the end 22A thereof truncated at 23A, at an angle of approximately 15 degrees.

The body 21A is provided with a generally circular conical recess 24A formed in the end 22A thereof with its axis perpendicular to the truncated end 23A. The conical recess 24A has its axis intersecting the axis of the body 21A and extending through a diameter of the body 20A, extending through the low point 25A of the truncated end 23A. The conical recess 24A is arranged so that its major diameter intersects the circumference of the cylindrical body 21A at a point 26L spaced 120 degrees counterclockwise from the low point 25A, as viewed in Figures 13 and 14, and intersects the circumference of the body 21A at a second point 26R spaced 120 degrees from the low point 25A in a clockwise direction, as seen in Figures 13 and 14.

The body 21A is provided with a cylindrical bore 27A and a threaded bore 28A to receive a retainer, generally indicated at 36A, and a bolt 42A.

A cutter bit 29A, identical in cross section to the cutter bit 29, is provided with cutting edges 35L and 35R on the opposite ends thereof. The cutting edges 35L and 35R are formed in the same manner as the cutting edge 35 by grinding the end of the cutter bit 29 flat across the end thereof radially.

The cutter bar 20A is adapted to cutting use in either direction of rotation by adjusting the cutter bit 29A so that the cutting edge 35L is positioned adjacent the point 26L, or the cutting edge 35R is positioned adjacent the point 26R, for the opposite direction of rotation. The cutter bit 29A is adjustable by rotating in the recess 24A in the same manner that the cutting bit 29 is adjusted with respect to the body 21.

The operation of the adjustable boring bar 20A after the cutting bit 29A has been secured in place in adjusted position therein is identical to the operation of the boring bar 20.

Having thus described the preferred embodiments of the invention, it should be understood that numerous structural modifications and adaptations may be resorted to in addition to those illustrated without departing from the scope of the appended claims.

What is claimed is:

1. An adjustable boring bar for cutting counter bores completely to the bottom thereof, comprising an elongated, generally cylindrical solid body, said body having one end thereof angularly truncated, a threaded bore arranged eccentric to the truncated end of said body and having its axis perpendicular to said truncated end, said threaded bore having an enlarged cylindrical bore communicating with the outer end thereof adjacent to but spaced inwardly from the truncated end of said body, said body having a conical recess formed in the truncated end thereof in axially aligned relation with the threaded bore with said recess communicating with said enlarged cylindrical bore, a ring shaped cutting bit seated in said recess, a headed retainer engaged with said cutting bit and seated in the enlarged cylindrical bore, a bolt extending through said retainer into said threaded bore clamping said retainer into engagement with said cutting bit whereby said cutting bit is mounted to said boring bar for rotary adjustment in said conical recess.

2. A device as claimed in claim 1 wherein said cutting bit is provided with a cutting edge formed on one end thereof radially of said cutter bit.

3. A device as claimed in claim 1 wherein said cutter bit is provided with a pair of cutting edges formed radially of said cutter bit on opposite ends thereof.

4. A device as claimed in claim 1 wherein said conical recess intersects the circumference of said cylindrical body at a point spaced 135 degrees from the low point of the intersection of said truncated end with the circumference of said body.

5. A device as claimed in claim 1 wherein said conical recess intersects the circumference of said body at a point spaced 120 degrees from the low point of the intersection of said truncated end with the circumference of said body, and said conical recess intersects the circumference of said body at a second point spaced 120 degrees from the low point of the intersection of said truncated end with the circumference of said body on the opposite side of said low point.

References Cited in the file of this patent

UNITED STATES PATENTS

| 417,839 | Berger | Mar. 29, 1892 |
| 2,383,958 | De Vliey | Sept. 4, 1945 |

FOREIGN PATENTS

| 680,231 | Germany | Aug. 24, 1939 |
| 1,113,808 | France | Dec. 12, 1955 |